May 20, 1958
H. WURZEL
2,835,028
TOOLS FOR ASSEMBLING SPRING RETAINING RINGS
Filed Sept. 14, 1955
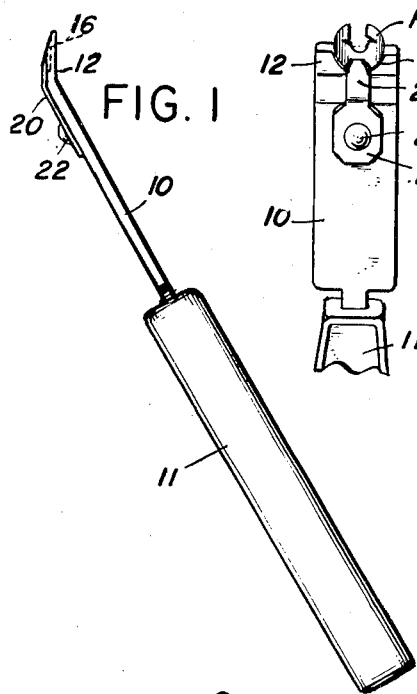
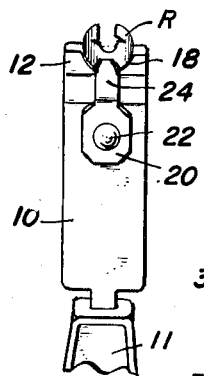
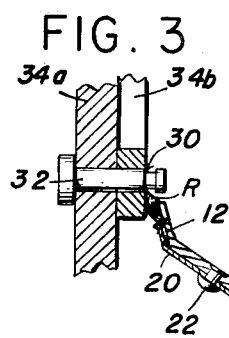
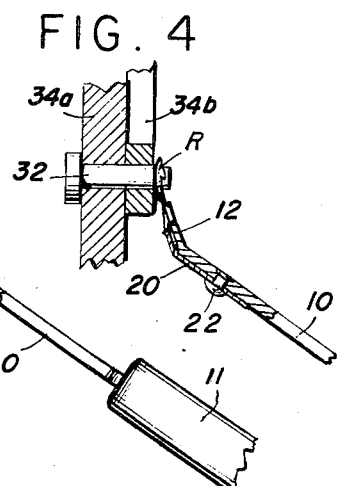
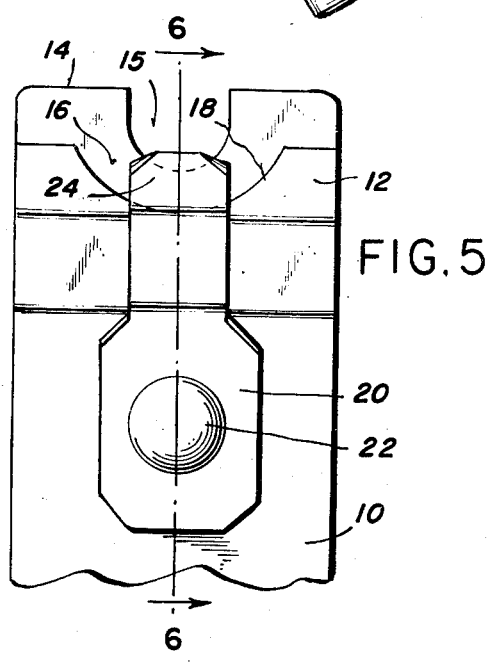
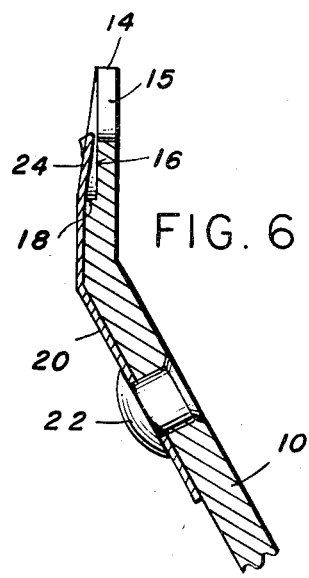
INVENTOR
HUGO WURZEL
BY *J. Harold Kilcoyne*
ATTORNEY United States Patent Office 2,835,028
Patented May 20, 1958

2,835,028

TOOLS FOR ASSEMBLING SPRING RETAINING RINGS

Hugo Wurzel, Bronx, N. Y., assignor to Waldes Kohinoor, Inc., Long Island City, N. Y., a corporation of New York Application September 14, 1955, Serial No. 534,263

2 Claims. (Cl. 29—229)

This invention relates to improvements in tools for assembling spring retaining rings, and more particularly to an improved retaining ring applying tool, or so-called applicator, for gripping and holding open retaining rings, of the type which are bowed about their vertical center line by an amount such that they must be flattened somewhat in their assembly, during the various operations involved in assembling them on shafts, pins and like carrier members.

Flat open retaining rings, i. e. plane rings having a gap between their open ends of width slightly less than but substantially equal to the diameter of the bottom of their seating groove whereby the rings may be assembled by forcing them over their shafts in the plane of said groove, are of course well known, as are the tools for applying them, one such tool being of the type disclosed and claimed in patent to Brell 2,483,379, dated September 27, 1949. However, if the rings are of the vertically bowed type, i. e. bowed about their vertical center line, as yields the advantages of the rings being easier to assemble as compared to the plane open ring, and also of being capable of taking up end play due to manufacturing tolerances, the conventional applying tool cannot be used since it is not designed to secure to the body of the ring, as distinguished from its edge, as is required for the ring to flatten in assembly.

Stated broadly, an object of the invention is the provision of a simple yet effective and thoroughly dependable tool for gripping and holding vertically bowed open retaining rings during the various operations involved in applying them on shafts, pins and the like, for example, in picking off the rings one by one from a stack or column thereof, in handling them in their progress from the stack to their shafts or pins, and, finally, in spreading them over said shafts or pins in the plane of the grooves provided thereon for their reception and bottoming them in said grooves.

A more particular object of the invention is the provision of a simple blade-like applying tool for assembling vertically bowed, open spring retaining rings on grooved shafts, pins and like carrier members, characterized by its ability to securely grip such rings in their middle body portions, as distinguished from along their peripheral edges, and of so holding the rings that they may be presented to their shafts and assembled thereon with their convex sides facing forwardly or towards the outer wall of the shaft grooves.

Yet another object of the invention is the provision of a ring applying tool capable of functioning as stated, and which also is so constructed and arranged as to permit the vertically bowed ring held thereby to flatten as it is being pushed into its groove.

Still another object of the invention is the provision of a retaining ring applicator useful in applying vertically bowed open retaining rings on grooved shafts, pins and the like which is constructed and arranged as to enable the rings to be flattened in assembly as required to effect their movement into their seating grooves, and also to back up the rings as insures their positive and controlled movement into the grooves.

The above and other objects of the invention will appear from the following detailed description of an improved ring applying tool as herein proposed, in which reference is had to the accompanying drawing illustrating a preferred physical embodiment thereof, wherein Fig. 1 is a side elevation of a ring applying tool of the invention;

Fig. 2 is a broken-away rear elevation of the ring applying tool illustrated in Fig. 1, the view illustrating the manner in which the tool grips and holds a vertically bowed open spring retaining ring in position for its assembly;

Fig. 3 is a view illustrating the action of the tool in properly presenting a ring held thereby to a grooved shaft or pin for assembly thereon;

Fig. 4 is a view similar to Fig. 3 but illustrating the tool being withdrawn from the assembled ring;

Fig. 5 is an enlarged view looking on to the rear or under face of the working end of the tool according to Fig. 1, which further illustrates details of its construction; and Fig. 6 is a section taken along line 6—6 of Fig. 5.

Referring to the drawings, a ring applying tool according to the present invention comprises an elongated blade member 10 having a handle 11 affixed to one end thereof and whose other or working end, generally designated 12, is preferably inclined at an obtuse angle from the body of the blade, whereby the handled end of the tool is offset from the work during assembly of a ring held thereby, as is shown in Fig. 3.

Referring to Figs. 5 and 6, the working end 12 of the blade terminates in a transverse edge 14, and preferably there is formed in the central portion of said edge a substantially semicircular notch-like opening 15 having diameter slightly greater than that of the diameter of the shaft on which ring assembly is to be effected, and hence also greater than that of the inner edge of the rings being assembled, whose general construction will be later discussed. According to the invention, material is removed as by a milling operation from the under face of the blade end 12 along the edge of the opening 15, and preferably also along the transverse edge portions 14 of said end which extend to the sides of said opening 15. Such effects thinning of the working end of the blade particularly along the opening 15, as results in the formation of an open-face recess 16 in the under surface of the working end of the blade, which recess is defined in part by an arcuate shoulder 18 set back from the edge of the notch-like opening 15. It is a feature of the invention that said shoulder 18 has radius corresponding substantially to that of the outer edge of the retaining ring being assembled, and also that it is set back from the edge of the opening 15 by an amount less than the radial thickness of said ring, and from the line of the edge portions 14 by an amount which is preferably somewhat greater than the external radius of said ring. Thus, when a ring R is seated in the recess 16 in the manner illustrated in Fig. 2, i. e. with its outer edge engaging against the shoulder 18 and with its opening overlying the opening 15, the inner edge of the ring overhangs the edge of the said opening 15. It will also be understood that the under or bottom wall of the recess 16 which provides the closed face thereof serves as a flat or plane backing flange for a ring held in said recess, against which the side portions of the ring which normally curve away therefrom consequent to its bowed configuration may flatten as required in its assembly.

According to a further feature of the invention, spring means for securing a ring received and positioned as aforesaid in the recess 16, in such a way as to permit it to flatten against said backing flange, is provided. Referring to Fig. 6, such preferably comprises a leaf spring 20 having one end rigidly affixed to the blade 10 proper as by a rivet 22, in position such that its other or free end 24 overlies the center line portion of the aforesaid ring recess 16. Preferably, the spring 20 is offset to follow the offsetting of the blade member proper and its working end, and also the free end of the spring is bent slightly inwardly so as to incline into the plane of the recess, thereby to exercise a firm holding effect on the middle portion of a ring body received therein.

As explained in the foregoing, a tool as described is designed for the special purpose of applying open spring retaining rings which are vertically bowed, i. e. bowed about a longitudinal center line extending through the middle portion and wide ring gap of said rings, and for which the conventional tool for applying flat or plane open retaining rings is unsuited. In particular, a tool according to the present invention is capable of gripping a vertically bowed open spring retaining ring in its middle portion and of so presenting it to the work that it may flatten and so that when it is assembled its convex face is disposed outwardly or towards the outer wall of its seating groove. The aforesaid functioning of the tool will be seen from Figs. 2, 3 and 4, it being understood that Fig. 2 shows a ring gripped by the tool along its middle portion and with its concave face disposed outwardly and hence with its convex face lying adjacent the bottom wall (backing flange) of the recess 16 in which it is received.

It will be observed that when so positioned the free end 24 of the leaf spring 20 resiliently holds the ring with its outer edge in engagement with the arcuate shoulder 18 of the recess and with its inner edge overhanging the edge of the notch-like opening 15. When so held, the ring may be presented to its groove designated 30 (Fig. 3) which, for illustration purposes, is shown to be formed in a shaft or pin 32 extending through two members 34a, 34b to be secured together by the ring upon its assembly in said groove. Analysis of this view will show that the tool presents the ring to the groove with its convex face disposed forwardly or toward the outer wall of said groove. As the tool is moved toward the shaft 32 in the plane of the groove, it forces the ring into said groove and it also holds the ring so that it may flatten in controlled manner against the flat bottom wall of the recess 16.

Upon bottoming of the inner edge of the ring in the groove 30, the tool may be disengaged from the now fully assembled ring simply by backing it off from said ring. Here it is to be understood that while the leaf spring 20 grips the ring with sufficient force as normally to hold the ring in the recess 16, either such holding force is, by design, less than the force with which the ring grips the bottom of the groove, or the ring is of the type provided with locking prongs which lock the ring to the shaft when once assembled thereon, with the result that in either case the tool may be simply backed off from a ring once its bottoming in the groove has been completed.

Without further analysis, it will be seen that a tool according to the invention is especially adapted to the gripping and holding of vertically bowed open retaining rings during the operations involved in the assembly thereof, for example, in picking off the rings one by one from a stack or column thereof, in handling the individual rings in their progress from the stack or column to the work, in properly presenting a ring to the groove, and, finally, in bottoming it in said groove. However, as many changes could be made in carrying out the above constructions without departing from the scope of the invention, it is intended that all matter contained in the above description or shown in the accompanying drawing shall be interpreted as illustrative and not in a limiting sense.

I claim:

1. A tool for gripping and holding vertically bowed open spring retaining rings during the operations involved in assembling them in the grooves of shafts, pins and the like, comprising a blade member of rigid construction throughout having a working end which is offset angularly from the blade proper and terminates in a transverse edge, said edge having a substantially semicircular notch-like opening formed in its central portion, the blade having a reduced thickness portion extending along said transverse edge and about said opening and forming an open-face recess defined by an arcuate shoulder set back from the opening edge, the diameter of said opening being greater than the diameter of the inner edge of the retaining rings being assembled and said shoulder extending along the arc of a circle of diameter corresponding substantially to the outer diameter of said ring and being set back from the opening edge a distance less than the radial width of said ring and also from said transverse edge a distance greater than the outer radius of said ring, whereby the inner edge of a ring positioned in said recess with its outer edge engaging said shoulder overhangs said opening edge and the reduced thickness portions of the blade end to the side of said opening provide a backing for the side portions of the ring which ficilitates flattening thereof during assembly, and spring means carried by said blade overlying said recess for resiliently securing a ring received in said recess positioned as aforesaid.

2. A tool for gripping and holding vertically bowed open spring retaining rings as defined in claim 1, wherein said spring means comprises a leaf spring whose one end is rigidly affixed to the blade rearwardly of the ring recess and whose free end overhangs said arcuate shoulder and overlies said recess whereby to press on the face of a ring received in said recess.

References Cited in the file of this patent

UNITED STATES PATENTS

| | | |
|---|---|---|
| 1,456,007 | Hartson et al. | May 22, 1923 |
| 1,647,204 | Susdorf | Nov. 1, 1927 |
| 2,483,379 | Brell | Sept. 27, 1949 |
| 2,597,381 | Roper | May 20, 1952 |
| 2,650,722 | Stabile | Sept. 1, 1953 |

FOREIGN PATENTS

| | | |
|---|---|---|
| 126,960 | Sweden | Dec. 20, 1949 |